3,834,896
RECOVERY OF GOLD
Judith A. Eisele, Verdi, and Harold J. Heinen, Reno, Nev., assignors to the United States of America as represented by the Secretary of the Interior
No Drawing. Filed June 21, 1972, Ser. No. 265,011
Int. Cl. B01j 1/22; C01g 7/00; C22b 11/00
U.S. Cl. 75—112                                4 Claims

ABSTRACT OF THE DISCLOSURE

Gold is recovered from its ores by treating the ores at elevated temperature with gaseous chlorine in the presence of (1) a promoter comprising a compound of iron, aluminum or gallium and (2) activated carbon, whereby the complex $AuMeCl_6$, where Me is iron, aluminum or gallium, is formed and is adsorbed on the activated carbon. The gold-laden activated carbon is then separated from the gangue by froth flotation and the gold recovered from the carbon by conventional means.

---

Application Ser. No. 189,198, filed Oct. 14, 1971, discloses and claims a process for recovery of gold from gold ores by treating the ores at elevated temperature with gaseous chlorine in the presence of promoter comprising a compound of iron, aluminum or gallium to form the complex $AuMeCl_6$, where Me is iron, aluminum or gallium. The complex is removed from the reaction zone in vapor form and condensed to recover the gold. Although this process gives substantially improved results over the prior art processes, it has been found that its application to certain ores, particularly refractory non-oxidized ores, does not result in complete volatilization of the gold. This is believed due to other constituents in the ores that are capable of suppressing the vapor transport of the complex.

It has now been found that the above deficiency may be overcome and an improved yield of gold obtained by admixing activated carbon with the ore and promoter prior to treatment with chlorine. The activated carbon adsorbs, or reacts with, the volatile gold complex as it is formed and the resulting gold-laden carbon is separated by froth flotation. Conventional procedures are employed to recover the gold from the carbon.

The process of the invention may be carried out in any apparatus capable of providing the required stream of gaseous chlorine, intimate contact between ore, promoter, carbon and gaseous chlorine, suitable operating temperature and means for separating the gold-laden carbon by flotation. Suitable types of apparatus include rotary kilns, electric tube furnaces, fluid bed reactors, etc., provided with inlet and outlet means for the chlorine reactant and the gaseous products of the reaction, largely unreacted chlorine. Means should also be provided for agitating the ore in order to provide efficient contact with the gaseous chlorine.

The ore may be any conventional gold ore, including low-grade ores from which the gold cannot be economically recovered by means of prior art processes. The ores usually consist of gold associated with quartz, other metals, sulfides or tellurides. As mentioned above, the process of the invention is particularly effective for recovery of gold from refractory non-oxidized ores. The ore is initially ground to a particle size of about one inch to 200 mesh to enable efficient contact with the gaseous chlorine.

Suitable temperatures will range from about 200 to 500° C. Higher temperatures, e.g., up to about 1000° C., may be used; however, this usually results in little, if any, increase in recovery of gold. In fact, one of the chief advantages of the invention is the efficiency of recovery of gold at lower temperatures than those employed in the prior art.

The chlorine reactant preferably consists of essentially pure gaseous chlorine, although small amounts of air or inert gases may not substantially decrease the recovery of the gold. Optimum amount and flow rate of the gaseous chlorine will vary with different types of ore, amount of ore, temperature, etc., and are best determined experimentally. However, flow rates of about 5 ml./min. to 60 ml./min. are usually satisfactory, with about 100 to 90 percent by weight of chlorine, based on the amount of ore, usually giving good results.

Optimum time of reaction will also depend on the above-discussed variable, but a reaction time of about 5 minutes to 1 hour usually results in efficient recovery of the gold.

It has been found that the volatile complex $AuMeCl_6$ is formed by way of an intermediate compound of the formula $Me_2Cl_{6(g)}$, where Me is iron, aluminum or gallium. In the presence of this compound, and chlorine, gold reacts to form the volatile $AuMeCl_6$. Hence, the promoter employed in the process of the invention comprises a compound of iron, aluminum or gallium which, in the presence of chlorine, will react to form the anhydrous chloride $Me_2Cl_{6(g)}$. Particularly effective promoters have been found to consists of metallic, i.e., elemental, iron, a sulfide of iron, such as pyrite ($FeS_2$), ferrous sulfide (FeS), pyrrhotite ($Fe_5S_6$), chalcopyrite ($CuFeS_2$) or bornite ($FeS \cdot 2Cu_2S \cdot CuS$), aluminum sulfide or gallium sulfide. In addition, good results are obtained by the use of mixtures of elemental sulfur and ferric oxide, and elemental sulfur and ferric chloride hexahydrate.

The promoter is preferably added to the ore in a ground state, i.e., a mesh size of about 10 to 325, and admixed with the ore before and during the reaction. However, it may also be added in bulk form, e.g., as lumps, without intimate mixture with the ore. The optimum amount of promoter will again depend on such variables as the specific type and physical state of the ore and promoter, temperature, etc., and is best determined experimentally. However, amounts of about 0.5 to 5 weight percent of promoter, based on the weight of the ore, are usually satisfactory. Where the naturally-occurring ore originally contains one or more of the promoter materials, a correspondingly smaller amount of promoter is required. Some ores may, in fact, contain sufficient amounts of promoter to permit direct treatment of the ore with gaseous chlorine at elevated temperature, without addition of further promoter material.

The activated carbon may be any of the conventional carbons characterized by high adsorptive capacity. These are usually prepared by heating carbon, char or charcoal to high temperature, e.g., about 800–900° C., with steam or carbon dioxide to form a porous particle structure. The activated carbon is generally characterized by an internal surface area of about 300 m.²/gm. to 2000 m.²/gm. and a density of about 0.5 gm./ml. It is used in the invention in a particle size of about 10 mesh to 325 mesh and in an amount of about 0.1 to 5.0 percent by weight, preferably about 0.5 to 1.0 percent by weight, based on the weight of the ore.

The calcine resulting from the elevated temperature chlorination is then cooled to room temperature, conveniently by quenching in water, ground to a size, usually minus 28 mesh, to provide smooth transport through a flotation plant and slurried in water in a flotation cell. The amount of water should be sufficient to provide a pulp density of about 5 to 50 percent solids. The flotation cell may be any conventional machine such as the Denver, Fagergren, Humboldt, Agitair, Minerals Separation Sub-Aeration, etc.

The gold-laden carbonaceous material is then floated from the gangue, i.e., the remaining constituents of the calcine, by aeration, using a conventional frother such as fuel oil or pine oil. The frother may be fed either directly at 100 percent strength, or emulsified to a suitable dilution in an amount ranging usually from about 0.01 to 5 pounds per ton of feed material. Aeration is preferably by means of "mechanical" cell air or "pneumatic" cell air, conventional in the froth flotation art, to provide bubbles ranging in size from about 0.05 to 3 mm. diameter. Additional flotation reagents such as collectors or activators are usually not required to achieve a high degree of separation of the carbonaceous material and the gangue.

The layer of froth or foam formed at the top of the flotation cell, and containing the gold-laden carbonaceous material, is skimmed off using conventional unmechanized froth overflow techniques. In the cleaner operation, generally employed, the rougher concentrates are thinned to maintain a thick layer of froth in order to obtain the maximum cleaning action. The cleaner concentrates are then treated to recover the gold. This treatment consists of conventional procedures such as leaching with caustic cyanide, and electrolysis, as described in Bureau of Mines Report of Investigations 4843. Preferably, the leaching and electrolysis are done simultaneously to shift the desorption equilibrium so that essentially all of the gold is desorbed from the carbon. After electrolysis, the gold is stripped from the cathode and melted directly to bullion in the presence of conventional fluxes. Another conventional procedure consists of burning the carbon particles at a temperature of about 600° C., followed by smelting the resulting gold-containing ash with a flux containing sodium carbonate and borax to produce a gold button.

The invention will be more specifically illustrated by the following examples.

Examples 1–11

In these examples, gold was recovered from a refractory non-oxidized ore, the principal sulfide minerals in the ore being realgar and orpiment with lesser amounts of pyrite, pyrrhotite and arsenopyrite. The ore contained 0.33 ounce gold per ton, 4.5 percent arsenic, 5.6 percent iron, 2.0 percent sulfide sulfur and less than 20 p.p.m. each of copper and lead. 50 grams of the ore (minus 65-mesh) was intimately admixed with 1 gram of activated carbon having an internal surface area of 1000 m.²/gm., a density of 0.5 gm./ml. and a particle size of —100 mesh. The mixture was placed in a 1-inch diameter ceramic tube inside the heating zone of a 1½-inch diameter tube furnace provided with a gas inlet and outlet. Chlorine gas was passed through the system at a rate of 10 ml./min. while the furnace was maintained at various temperatures for varying time periods as shown in Table 1.

The inner tube was then removed from the furnace and the calcine was cooled and added to 0.25 liter of water in a flotation cell. About 0.1 pound of frother per ton of feed was added to the resulting pulp. The carbonaceous material was floated from the gangue by agitation in a flotation machine which introduced and dispersed air in the form of fine bubbles throughout the pulp. The resulting froth was removed from the surface of the water by means of skimming or by overflowing the froth from the flotation cell, and the gold contents of the carbon concentrates and of the tailings (gangue) were determined by fire assay. Results are shown in Table 1.

TABLE 1

| Example: | Period of calcining, minutes | Temperature, °C. | Gold recovery, percent |
|---|---|---|---|
| 1 | 15 | 300 | 73 |
| 2 | 15 | 400 | 80 |
| 3 | 15 | 500 | 79 |
| 4 | 30 | 200 | 41 |
| 5 | 30 | 250 | 72 |
| 6 | 30 | 300 | 78 |
| 7 | 30 | 400 | 86 |
| 8 | 30 | 500 | 94 |
| 9 | 60 | 300 | 77 |
| 10 | 60 | 400 | 93 |
| 11 | 60 | 500 | 93 |

Examples 12–14

In these examples, gold was recovered from an oxide ore using added iron powder or pyrite as promoter. The ore contained finely disseminated gold in a porous siliceous gangue matrix. The ore assayed 0.4 ounce gold per ton and less than 20 p.p.m. each of lead and copper, and it contained no sulfide minerals. 1 gram of the iron powder or pyrite was mixed with the ore and activated carbon prior to chlorination. The calcination temperature was 300° C. and the period of calcining was 1 hour.

Experimental conditions were otherwise the same as in Examples 1–11. Results are shown in Table 2.

TABLE 2

| | Additive | Gold recovery, percent |
|---|---|---|
| Example: | | |
| 12 | None | 20 |
| 13 | Fe powder | 66 |
| 14 | Pyrite | 80 |

Example 15

This example illustrates recovery of gold-laden activated carbon obtained by the process of the invention. A five gram sample of gold-laden (5.15 mgs. gold) activated carbon, obtained by the procedure of Example 1, was admixed with 100 ml. of 1.0 percent NaOH—0.1 percent NaCN and the mixture was heated to boiling. Simultaneously, the hot mixture was electrolyzed using concentric platinum electrodes. The gold was stripped from the cathode with a warm cyanide solution containing a few drops of hydrogen peroxide. Assay of this solution showed substantially complete description of gold from the activated carbon and recovery of over 95 percent of the total gold.

Example 16

This example illustrates a second method of recovery of gold from the gold-laden activated carbon. One gram of gold-laden activated carbon containing 1.03 mgs. gold, obtained by the process of the invention, was placed on a bed of 35 mesh sand in a scorifier dish and burnt in a furnace at 600° C. The ashed residue and sand were mixed with conventional fluxes and fire assayed. The resulting gold ore weighed 1.03 mgs., indicating complete recovery of gold.

We claim:

1. A process for recovery of gold from gold ore comprising contacting the ore at a temperature of about 200 to 500° C. with gaseous chlorine in the presence of (1) a promoter from the group consisting of metallic iron, a sulfide of iron, aluminum sulfide, gallium sulfide, a mixture of elemental sulfur and ferric oxide, and a mixture of elemental sulfur and ferric chloride hexahydrate capable of reacting with gaseous chlorine to form the compound $Me_2Cl_6(g)$, where Me is iron, aluminum or gallium and (2) activated carbon, whereby a volatile complex consisting essentially of $AuMeCl_6$, where Me is iron, aluminum or gallium, is formed and is adsorbed on the activated carbon, separating the gold-laden activated carbon from ore gangue by means of froth flotation and subsequently recovering metallic gold from the gold-laden activated carbon.

2. The process of claim 1 in which the promoter is metallic iron.

3. The process of claim 1 in which the promoter is a sulfide of iron.

4. The process of claim 3 in which the promoter is pyrite.

References Cited

UNITED STATES PATENTS

| 2,828,200 | 3/1958 | Nixon | 75—83 |
| 2,450,764 | 10/1948 | Meyers | 252—444 |
| 2,476,420 | 7/1949 | Krebs | 75—118 |

FOREIGN PATENTS

| 275,945 | 1/1928 | Great Britain | 75—112 |

OTHER REFERENCES

Mellor: A Comprehensive Treatise on Inorganic Theoretical Chemistry, Vol. 3 (1922), p. 593.

OSCAR R. VERTIZ, Primary Examiner

HOKE S. MILLER, Assistant Examiner

U.S. Cl. X.R.

75—118; 252—444; 423—26, 40